PRE-AGING OF ELECTROSTRICTIVE CERAMICS

Original Filed April 29, 1953 2 Sheets-Sheet 1

INVENTOR
W. P. MASON
BY H. O. Wright
ATTORNEY

PRE-AGING OF ELECTROSTRICTIVE CERAMICS

Original Filed April 29, 1953 2 Sheets-Sheet 2

INVENTOR
W. P. MASON
BY H. O. Wright
ATTORNEY

United States Patent Office 2,940,158

Patented June 14, 1960

2,940,158

PRE-AGING OF ELECTROSTRICTIVE CERAMICS

Warren P. Mason, West Orange, N.J., assignor to Bell Telephone Laboratories, Incorporated, New York, N.Y., a corporation of New York Original application Apr. 29, 1953, Ser. No. 351,843, now Patent No. 2,906,973, dated Sept. 29, 1959. Divided and this application May 7, 1958, Ser. No. 733,679

7 Claims. (Cl. 29—25.35)

This invention relates to electrostrictive ceramics. More particularly, it relates to methods of "pre-aging" elements of such ceramics to stabilize their characteristics.

This application is a division of my copending application Serial No. 351,843, filed April 29, 1953, now Patent No. 2,906,973, issued Sept. 29, 1959.

Electrostrictive ceramics have been found subject to variation with age commonly called "aging" effects whereby, for example, the resonant frequency of mechanical vibration of an element of the ceramic can change by several percent, and the dielectric constant and the electromechanical coupling factor can each change by as much as fifteen percent within a period in the order of six months.

Such changes are generally referred to as "aging" effects and if of appreciable magnitudes, as described above, may render questionable the value of the materials for use in the manufacture of elements for electromechanical transducers, filter elements, or delay lines.

Accordingly, it is a principal object of the invention to eliminate the propensity of elements of electrostrictive ceramic materials to change their electrical, mechanical, and electromechanical properties appreciably with age.

The invention accomplishes this object by methods of heat treating the elements at several successively lower temperatures intermediate the Curie temperature of the material and room temperature for predetermined successive intervals of time. Since these methods are directed toward the elimination of "aging" effects, they are referred to as "pre-aging" methods.

In accordance with a further method of the invention, a polarizing potential is simultaneously applied to the element during the successive heating intervals and produces an increase in the electromechanical coupling coefficient.

Other and further objects, features and advantages of the invention will become apparent during the following detailed description of specific illustrative applications of the principles of the invention and from the appended claims.

The two compositions employed for specific illustrative purposes in the present application are those designated as compositions D and E, respectively, in my above-mentioned copending parent application.

As shown in Table I on page 6 of my parent application, these materials are both ternary compositions of the three titanates, namely barium titanate, calcium titanate, and lead titanate.

Composition D comprises a mixture of 79.8 percent of barium titanate, 12 percent of lead titanate, and 8.2 percent of calcium titanate.

Composition E comprises a mixture of 83.4 percent of barium titanate, 8 percent of lead titanate, and 8.6 percent of calcium titanate.

Figure 1:
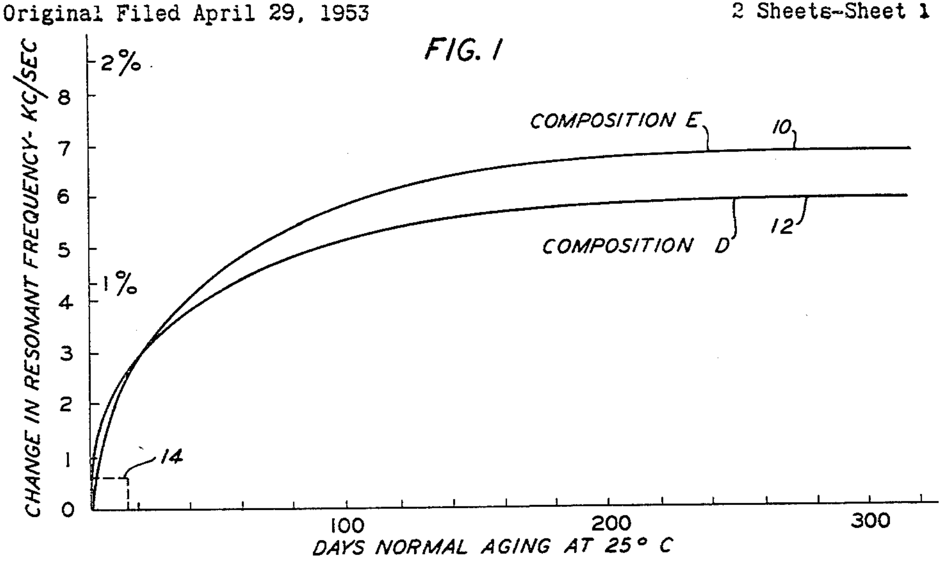
Fig. 1 illustrates the variation with age in the frequency characteristics of two typical electrostrictive ceramic materials which have not been subjected to the "pre-aging" methods of the invention.

In more detail, in Fig. 1 curve 10 illustrates for composition E the variation resulting from "normal aging" in the resonant frequency of an element of composition E in both kilocycles and percent. Throughout the present application, "normal aging" is to be understood to mean the changes with age which can be expected if no "pre-aging" treatment has been applied to the element. "Room temperature" is, in accordance with conventional use in the art, assumed to be 25° C., though the "normal range" of room temperatures is commonly accepted as being substantially 13° C. to 44° C., or 55° F. to 110° F., the range taking into account variations likely to occur throughout an average year in temperate climates within the average building having automatic central heating during the colder months of the year.

Similarly, curve 12 of Fig. 1 illustrates for composition D the variation resulting from "normal aging" in the resonant frequency of an element of composition D. Since a one percent variation is approximately 4.3 kilocycles, the elements initially were resonant at approximately 430 kilocycles.

Figure 2:
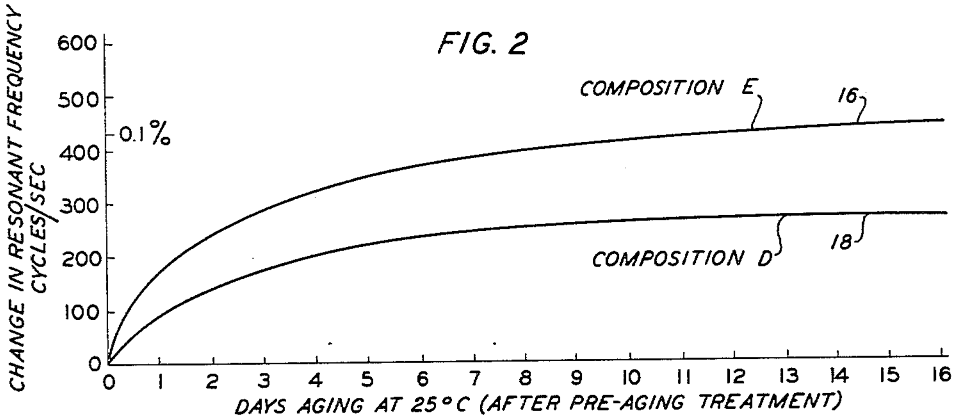
Fig. 2 illustrates the improved stabilization of the frequency characteristics of the materials of Fig. 1 effected by "pre-aging" in accordance with the methods of the invention.

The small area enclosed by dash-line 14 in the lower left corner of Fig. 1 represents graphically, for convenient comparison, the area on Fig. 1 which is covered to a much enlarged scale in Fig. 2.

In Fig. 2, curve 16 represents the further variation in the resonant frequency of an element of composition E after having been "pre-aged" in accordance with the principles of the present invention. Similarly, curve 18 of Fig. 2 represents the further variation of an element of composition D after having been "pre-aged" in accordance with the principles of the present invention.

As shown in Fig. 2 the further aging, or change in resonant frequency, after "pre-aging" in accordance with the present invention is substantially one-tenth of one percent for composition E and five-hundredths of one percent for composition D. It should be particularly noted also that after only two weeks (fourteen days) the further aging, as shown in Fig. 2, has been substantially completed and thereafter any changes with age should be of entirely negligible magnitudes.

Figure 3:
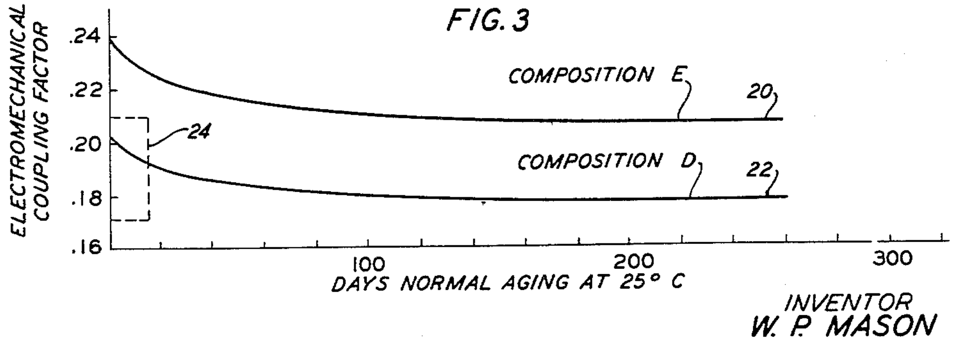
Fig. 3 illustrates the variation with age in the electromechanical coupling factor of the materials of Fig. 1 prior to "pre-aging" in accordance with the methods of the invention.

In Fig. 3, curves 20 and 22 illustrate for compositions E and D, respectively, the changes in the electromechanical coupling factor with normal aging.

Figure 4:
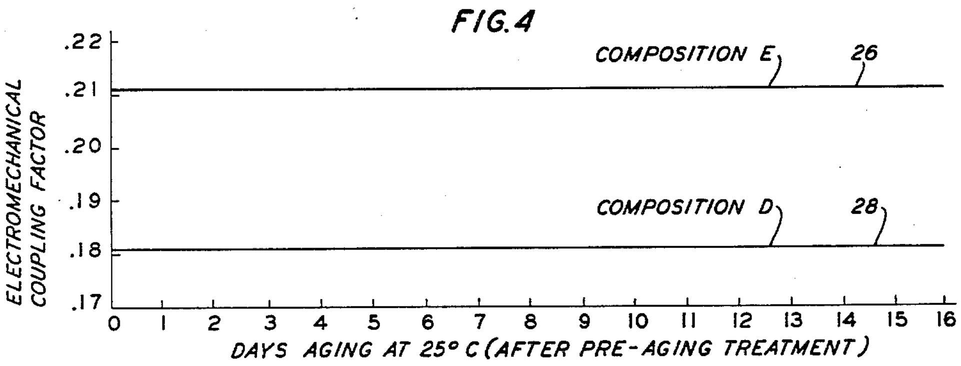
Fig. 4 illustrates the improved stabilization of the electromechanical coupling factor of the materials of Fig. 1 effected by "pre-aging" in accordance with the methods of the invention.

The small area enclosed by the dash-line 24 at the left of Fig. 3 represents graphically, for convenient comparison, the area of Fig. 3 which is covered to a much enlarged scale in Fig. 4.

In Fig. 4, lines 26 and 28 illustrate for compositions E and D, respectively, that the electromechanical coupling factor undergoes substantially no further changes with age after the elements have been pre-aged in accordance with the principles of the present invention.

Figure 5:
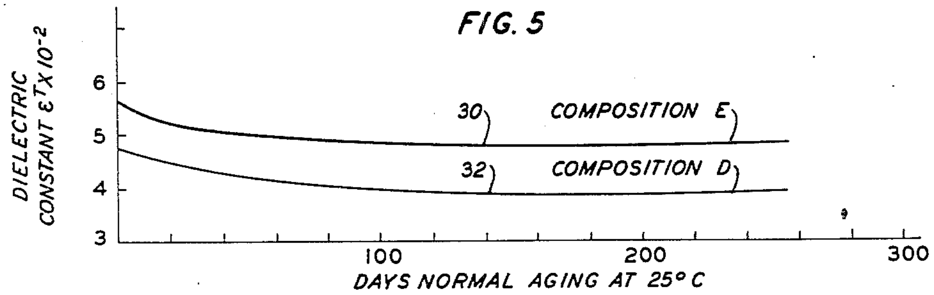
Fig. 5 illustrates the variation with age of the dielectric constant of the materials of Fig. 1 prior to "pre-aging" in accordance with the methods of the invention.

In Fig. 5, curves 30 and 32 illustrate for compositions E and D, respectively, the changes with "normal aging" of the dielectric constants of the materials. The effect of "pre-aging" upon the dielectric constant is, of course, simply to bring it to its final stable value much more quickly.

Figure 6:
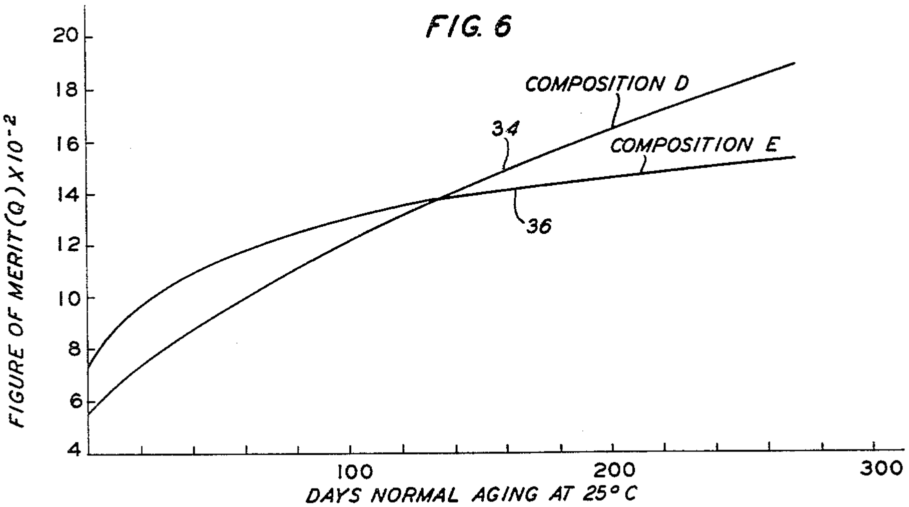
Fig. 6 illustrates the variation with age of the "figure of merit" or "Q" of the materials of Fig. 1 prior to "pre-aging" in accordance with the methods of the invention.

In Fig. 6, curves 34 and 36 illustrate for compositions D and E, respectively, the changes with normal aging of the "figure of merit" or "Q" of elements of said compositions. The effects of "pre-aging" upon changes of "Q" with age will be described hereinunder.

The "figure of merit" or "Q" is the ratio of reactance to resistance. For an electrical coil, by way of example, it is $2\pi fL$ divided by $R$, $f$ being the frequency in cycles per second, L being the inductance of the coil in henries, and R being the resistance of the coil in ohms. In an electromechanical system other factors must be considered, as discussed, for example, in applicant's book, entitled "Electromechanical Transducers and Wave Filters," published by D. Van Nostrand Co., Inc., New York City, 1942, at page 241.

While only two electrostrictive ceramic compositions have been chosen for specific illustrative purposes in the present application, it is to be clearly understood that they are representative of the general class comprising the numerous and varied materials and the mixtures of numerous and varied materials recognized by those skilled in the art as a falling within the general glass designated as electrostrictive ceramics.

Elements for use as transducers, filter elements, delay lines and the like can be made of such compositions as D and E, described above, and other electrostrictive ceramics in the following manner. Suitable quantities to afford the several specific percentages of the commercial grades of the three titanates, or other constituent materials, in powdered form and preferably having a fineness of, for example, 325 mesh, are wet-mixed in a ball mill. A suitable binder of any of numerous varieties well known in the art is then added. The binder should of course not react chemically with any of the components. A specific binder suitable for this purpose is, for example, wax emulsion No. 1214 manufactured by the Union Carbide and Carbon Corporation. From the mixture including the binder, elements of the dimensions and shape required for any specific use can be formed by pressure in appropriate metal molds. The elements are then fired in an oxidizing atmosphere (a free supply of air will suffice) at temperatures within the range of 1275° C. to 1400° C., the elements being gradually raised to the firing temperature, for example, at a rate of 200° C. per hour. After the firing temperature has been reached, the elements are permitted to cool slowly to room temperature.

If the elements are to be polarized, they should be provided with suitable electrodes such as fired on silver electrodes or metallic coatings deposited in a vacuum or any of the numerous other types well known in the art. A common poling process is to apply a voltage across the electrodes in the order of 35 volts per mil (.001 inch) of the thickness of the element between the electrodes, heat the element to a temperature above its Curie temperature, and maintain the applied voltage until the element has cooled again to room temperature. The remanent polarization remaining after this polarizing process will equal 80 percent of that effected by the applied field. Higher poling fields do not appear to increase the remanent polarization sufficiently to warrant their use.

The Curie temperature, as is well known in the art, is that temperature at which electrostrictive ceramics cease to exhibit piezoelectric and ferroelectric properties and it may vary considerably for various compositions. For example, barium titanate has a Curie temperature of 120° C. Titanate mixtures including a small percentage (4 to 12 percent) of lead titanate and a similar amount of calcium titanate may have a Curie temperature of about 140° C. A mixture of barium and strontium titanates may have a much lower Curie temperature depending upon the proportion of strontium titanate in the mixture. Other electrostrictive ceramics may have much higher Curie temperatures, for example, potassium niobate has a Curie temperature in the order of 430° C.

All of these electrostrictive ceramics exhibit appreciable changes in their electrical, mechanical and electromechanical properties with age, the majority becoming substantially stable within an interval of about six months if maintained throughout the interval at ordinary room temperatures. However, whenever an electrostrictive ceramic is heated above its Curie temperature, its properties again become subject to change with age so that the "aging" period required at room temperature for it to assume stable properties is again about six months. Accordingly, whether the ceramic has been poled, as for use as an electromechanical transducer, or has not been poled, as for certain uses as a dielectric material, it is preferably subjected to an adequate "pre-aging" treatment, as taught in the present application, if within the immediately preceding six months it has been raised to a temperature above its Curie temperature. After adequate pre-aging, it will exhibit the stabilized values of the properties it is intended to have, provided that thereafter its temperature is not permitted to rise to its Curie temperature or above.

A fundamental study of the "aging" of electrostrictive ceramics indicates that it is a relaxation phenomenon connected with the domain structure within the individual grains, since it is related to the transition through the Curie temperature. For the purposes of this application, the term "domain" is to be interpreted as meaning the smallest dipole unit into which ferroelectric crystalline material can be subdivided.

In accordance with the present invention, it has been found that "aging" effects can be largely eliminated by an adequate program of heating cycles to temperatures above room temperature but below the Curie temperature.

These must, of course, be performed subsequent to all treatments such as the forming treatment or the poling of the element above the Curie temperature, which require heating above the Curie temperature. This is obviously so since, as pointed out above, heating above the Curie temperature re-initiates the aging process by eliminating all changes which may have been effected by either normal aging or artificial aging (known as pre-aging).

The pre-aging methods of the invention comprise heating cycle programs in which the ceramic element to be aged is heated to a first temperature approximately midway between nominal room temperature (25° C.) and the Curie temperature but less than the Curie temperature and maintained at that temperature for several days after which its temperature is reduced in one or more steps, being left for several days at each of the one or more lesser temperatures between the first temperature and room temperature. Alternatively, the element may be successively raised to each of the several successively lower pre-aging temperatures in turn for the prescribed intervals, the element being permitted to cool to room temperature between successive heat treatments. No exact or rigid program nor choice of temperatures appears to be essential in effecting the "pre-aging." Any program conforming with the general features outlined above has been found to have a marked degree of effectiveness such that after a maximum of two weeks further aging at room temperature the properties of the element will have reached substantially stable values which will not change appreciably with age unless the element is subjected to a subsequent heating above its Curie temperature.

By way of specific illustrative example, for the two electrostrictive ceramic materials D and E described in detail above (and which have Curie temperatures of about 140° C.), the following program effected satisfactory pre-aging of the elements: Three days at 80° C. followed by three days at 50° C., following which all aging appeared to have ceased before the end of the second week at room temperature.

In accordance with one theory, the long aging time required at room temperature for electrostrictive ceramics to assume stable properties is caused by the high activation energy barrier that has to be surmounted when unit cells are rotated 90 degrees. In the case of unpolarized electrostrictive ceramics, when the temperature decreases through the Curie temperature, domains are formed in all axial directions inside a crystal grain. Due to irregular shapes and initial residual stresses, these domains are not all of the same size, and consequently they have different final residual stresses. The ones with the higher residual stresses have the lowest free energy, and hence an equalization of stresses takes place by unit cells rotating 90 degrees or 180 degrees from the direction of adjacent domains in such a manner as to reduce the stresses. On account of the high activation energy, this process takes about six months at room temperature. During this process and also during the pre-aging processes of the invention, the dielectric constant decreases and the stiffness increases.

When the electrostrictive ceramic is polarized, an additional motion of the domain walls occurs, thereby causing higher strains in the smaller size domains. These strains are also relieved by domain wall motion which progresses in such a direction as to reduce the locked-in polarization, and reduce the effective piezoelectric constant. Experiments have been performed which show that initial residual strain aging is more important for frequency and dielectric constant aging, whereas polarizing strain boundary motions are more important for piezoelectric constant aging.

In the process of "normal aging" and during pre-aging treatment also, the mechanical "figure of merit" or "Q" for compositions D and E increases from between 500 and 700 to between 1200 and 1500 or more, and hence the resulting materials make very satisfactory materials for low amplitude signal delay lines and filters. All of the new compositions of my copending parent application, for example, when "pre-aged" in accordance with the present invention compare favorably in stability with −18° X-cut quartz crystals, which are now being very widely used in electromechanical wave filters.

The properties of interest in an electrostrictive ceramic usually include the dielectric constant, the ratio of capacities of the ceramic used as a resonator, and the frequency of resonance, from which can be calculated the effective piezoelectric constant, the coefficient of coupling, and the elastic modulus. In testing these properties for the new compositions of my copending parent application, measurements were made on discs 0.787 centimeter in diameter and 0.152 centimeter thick vibrating in the radial mode. The results obtained are described in detail in my copending parent application. A portion of the results, applicable to compositions D and E, are, of course, shown in Figs. 1 through 6, inclusive, of the drawings accompanying this application.

It was further discovered that if during the "pre-aging" program such as that described in detail, by way of specific illustrative example, hereinabove, a polarized element of an electrostrictive ceramic was subjected to a further polarizing voltage of substantially half the voltage employed in polarizing it initially (i.e. one half of the 35 volts per mil thickness, for example, as described hereinabove) in the same direction as the initial polarizing voltage, the permanent coupling coefficient of the element could be increased by substantially ten percent.

Numerous and varied modifications and variations of the methods of the invention as described hereinabove will readily occur to those skilled in the art within the spirit and scope of the invention. No attempt to exhaustively cover all such modifications has been made.

What is claimed is:

1. The method of processing an electrostrictive ceramic element comprising raising the temperature of the element above its Curie temperature, applying a polarizing voltage across the element, cooling the element to a second temperature below the Curie temperature and above room temperature, removing the polarizing voltage, maintaining the second temperature for several days, cooling the element to a third temperature below the second temperature and above room temperature, maintaining the third temperature for several days, and thereafter cooling the element to room temperature, whereby aging effects are substantially eliminated.

2. The method of processing an electrostrictive ceramic element comprising raising the temperature of the element above its Curie temperature, applying a polarizing voltage across the element, cooling the element to a second temperature between the Curie temperature and 50 percent of the Curie temperature, reducing the polarizing voltage to substantially one half its original value, maintaining the second temperature and the reduced polarizing voltage for several days, cooling the element to a third temperature below the second temperature and above room temperature, maintaining the third temperature and the reduced polarizing voltage for several days, and thereafter cooling the element to room temperature.

3. The method of processing an element comprising a metallic titanate possessing piezoelectric properties which comprises applying a poling potential in the direction of the electric axis of said element at a temperature in excess of the Curie temperature thereof, and maintaining the element in an electrically charged condition for several days at each of at least two different temperatures between the Curie temperature and room temperature.

4. The method in accordance with claim 3 in which a field of the order of one half the initial poling field is applied to the element in the same direction as the initial poling field during treatment at each of the two different temperatures.

5. The method of processing an element comprising a metallic titanate possessing piezoelectric properties which comprises applying a poling potential along the electric axis of the element at a temperature in excess of the Curie temperature thereof, and maintaining the element in an electrically charged condition for approximately three days at substantially 80° C. and approximately three days at substantially 50° C.

6. The method of processing an element comprising a metallic titanate possessing piezoelectric properties which comprises applying a poling potential having a component along the principal direction of the electric axis of the element at a temperature in excess of the Curie temperature thereof, and maintaining the element in an electrically charged condition for several days at each of at least two different temperatures between the Curie temperature and room temperature.

7. The method of processing an element comprising a principal component of $BaTiO_3$ with additive components of $PbTiO_3$ and $CaTiO_3$ which comprises applying a poling potential in the principal direction of the electric axis of said element at a temperature in excess of the Curie temperature thereof, and maintaining the element in an electrically charged condition for several days at each of at least two different temperatures between the Curie temperature and room temperature.

References Cited in the file of this patent

UNITED STATES PATENTS 2,618,698 Janssen _______________ Nov. 18, 1952